Patented Nov. 6, 1945

2,388,477

UNITED STATES PATENT OFFICE 2,388,477

MODIFIERS FOR POLYMERIZATION OF BUTADIENE-1,3 HYDROCARBONS

Charles F. Fryling, Akron, Ohio, assignor to The B. F. Goodrich Company, New York, N. Y., a corporation of New York No Drawing. Application April 12, 1944, Serial No. 530,725

18 Claims. (Cl. 260—84.5)

This invention relates to the modification of the polymerization of butadiene-1,3 hydrocarbons to form synthetic rubber products closely resembling natural crude rubber in plasticity and processability, and particularly to the polymerization of butadiene-1,3 hydrocarbons in aqueous emulsion in the presence of a new and improved class of polymerization modifiers.

The polymerization in aqueous emulsion of butadiene-1,3 hydrocarbons either alone or in admixture with each other or with other organic compounds copolymerizable therewith to form products more or less resembling natural rubber is well known. It has been commonly observed, however, that such products often resemble vulcanized natural rubber rather than unvulcanized natural rubber in plasticity and processability unless the polymerization is effected in the presence of small amounts of certain organic substances called "modifiers" or "regulators" of polymerization.

One class of organic compounds which is effective in modifying the polymerization of butadiene-1,3 hydrocarbons so that products of improved plasticity and processability are formed, consists of compounds containing the 2-thiothiazyl group such as 2-mercapto-4, 5-dimethyl thiazole, 2-mercaptobenzothiazole and benzothiazyl-2 disulfide. This class of modifiers is disclosed in the copending application of Charles F. Fryling, Serial No. 396,155 filed May 31, 1941.

This application is a continuation-in-part of the said copending application Serial No. 396,155 and relates to the use of compounds containing a 2-thiothiazyl group and having a monovalent aryl group attached to a carbon atom of the 2-thiothiazyl group, in the emulsion polymerization of butadiene-1,3 hydrocarbons. These aryl-substituted 2-thiothiazyl compounds have been found to be especially valuable modifiers since their presence during the polymerization not only enables more plastic and more readily processable synthetic rubber products to be produced, but also enables the polymerization to be conducted more rapidly than is generally possible with 2-thiothiazyl type modifiers, and results in the production of polymers of improved tackiness and improved physical properties such as tensile strength.

Any compound containing the characteristic 2-thiothiazyl group and having a monovalent aryl group attached to a carbon atom of the 2-thiothiazyl group may be employed as the polymerization modifier in the method of this invention.

The 2-thiothiazyl group possesses the structure:

hence it is evident that in the compounds of this invention a monovalent aryl group will be attached to one of the carbon atoms numbered 4 and 5 in the above structure or to each of these carbon atoms. Any monovalent aryl group including phenyl, ortho- meta- and para-tolyl, alpha- and beta-naphthyl, xylyl, the various anthryls and the like may be the aryl group present, but compounds containing the 4-phenyl-2-thiothiazyl structure are generally preferred.

The nature of the remaining portions of the structure of the compounds described, that is, the groups attached to the unattached valence of the non-nuclear sulfur atom (the sulfur atom of the thio group) and to the unattached valences of the nuclear carbon atoms, if any, is of relatively lesser importance in this invention and may be varied widely, but generally they will consist of monovalent structures capable of being covalently bonded to the 2-thiothiazyl group, examples of which include hydrogen atoms, nitro, amino, hydroxy, carboxy, and other functional groups and also monovalent aliphatic, alicyclic, aromatic and heterocyclic organic residues or radicals whether or not containing functional or substituent groups and whether having their unattached monovalent bond on a carbon or some other atom. Ordinarily, the groups, if any, in addition to the essential aryl groups, attached to the nuclear carbon atoms of the 2-thiothiazyl group will be groups containing no elements other than carbon and hydrogen such as hydrogen and monovalent hydrocarbon groups including alkyl groups which may be straight chained or branched, long or short, as well as alkenyl, aralkyl and cycloalkyl groups; while the group attached to the sulfur atom of the thio group will be a monovalent group containing no elements other than carbon, hydrogen, oxygen, nitrogen and sulfur. In other words, the modifier employed will generally possess the following structure designated hereinafter as formula "A":

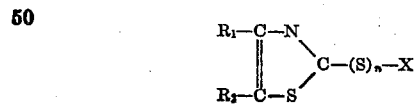

wherein $R_1$ and $R_2$ are hydrogen or monovalent hydrocarbon groups, at least one of which is a monovalent aryl hydrocarbon radical, $n$ is a small integer generally no greater than four, and X is a monovalent radical containing no elements other than carbon, hydrogen, oxygen, nitrogen and sulfur.

One principal type of compounds within the class described consists of compounds containing a 2-thiothiazyl group, a monovalent aryl group attached to a carbon atom of the 2-thiothiazyl group and a hydrogen atom attached to the non-nuclear sulfur atom of the 2-thiothiazyl group, that is, the aryl-substituted 2-mercapto thiazoles or C-aryl-2-mercapto thiazoles. Examples of compounds of this type include 4-phenyl-2-mercapto thiazole, 4,5-diphenyl-2-mercapto thiazole, 4-beta-naphthyl-2-mercapto thiazole, 4-paratolyl-2-mercapto thiazole, 4-phenyl-5-methyl-2-mercapto thiazole, 4-phenyl-5-nitro-2-mercapto thiazole and the like, the preferred compounds of this type being those conforming to formula "A" above wherein X is hydrogen, particularly 4-phenyl-2-mercapto thiazole.

The other principal type of compounds within the class described consists of the C-aryl thiazyl-2 sulfides, the term "sulfides" being used generically to include not only monosulfides but also di- and polysulfides and to include not only symmetrical sulfides but also unsymmetrical or mixed sulfides. The preferred sulfides are those conforming to formula "A" above wherein X is a monovalent organic radical containing no elements other than carbon, hydrogen, oxygen, nitrogen and sulfur and having its unattached monovalent bond on a carbon atom such as aliphatic, aromatic, alicyclic and heterocyclic groups. Monovalent radicals of this type in which the terminal carbon atom (the carbon atom bearing the monovalency) is a plurally bound carbon atom, that is, a carbon atom connected by a plural bond to another atom preferably an atom other than carbon such as oxygen, sulfur, or nitrogen; and which are electronegative in character such as aliphatic and aromatic acyl and thioacyl, carbamyl and thiocarbamyl, xanthogenyl and thioxanthogenyl, thiazyl, cyano, nitroaryl and similar radicals are especially preferred structures represented by X, although other radicals such as hydroxy-alkyl, amino-alkyl, arylaminoalkyl, alkyl, alkenyl and other monovalent aliphatic radicals; aminoaryl, alkoxyaryl, aryl and other aromatic radicals and furyl, pyridyl, quinolyl, indolyl and other heterocyclic radicals may also be the radical represented by X. Of these compounds, the symmetrical bis(C-aryl-thiazyl-2)-mono and disulfides, as well as the unsymmetrical thiazyl mono and disulfides wherein the group occupying the position of X in the general formula is a different thiazyl group including alkyl-substituted thiazyl groups and arylene thiazyl groups, are especially preferred.

Typical examples of C-aryl thiazyl-2 sulfides include the following:

Bis(4-phenyl-thiazyl-2) disulfide
Bis(4-phenyl-thiazyl-2) monosulfide
4-phenyl-thiazyl-2 thiomethylene hydrin (or 4-phenyl-thiazyl-2 hydroxy-methyl monosulfide, the reaction product of 4-phenyl-2-mercaptothiazole and formaldehyde)
4-phenyl-thiazyl-2 benzoyl monosulfide
4-phenyl-thiazyl-2 5-nitrobenzothiazyl-2 monosulfide
4-phenyl-thiazyl-2 cyano monosulfide (nitrile of 4-phenyl-2-mercaptothiazole)
4-phenyl-thiazyl-2 ortho-nitrophenyl monosulfide
4-phenyl-thiazyl-2 diphenyl-thiocarbamyl monosulfide
4-phenyl-thiazyl-2 acetyl monosulfide
4-phenyl-thiazyl-2 furoyl monosulfide
4-phenyl-thiazyl-2 thioacetyl monosulfide
4-phenyl-thiazyl-2 methyl-tolyl-carbamyl monosulfide
4-phenyl-thiazyl-2 thiazyl-2 monosulfide
4-phenyl-thiazyl-2 isopropylxanthogenyl monosulfide
4-phenyl-thiazyl-2 4,5-dimethyl thiazyl-2 disulfide
Bis(4-phenyl-thiazyl-2) tetrasulfide
Bis(4,5-diphenyl-thiazyl-2) trisulfide
4-phenyl-thiazyl-2 orthonitrophenyl disulfide
Bis(4-phenyl-5-methyl-thiazyl-2) disulfide
Bis(4-phenyl-5-nitro-thiazyl-2) disulfide
Bis(4-naphthyl-5-phenyl-thiazyl-2) disulfide
Bis(4-lauryl-5-tolyl-thiazyl-2) disulfide
Bis(4-phenyl-5-chloro-thiazyl-2) disulfide
4-phenyl-thiazyl-2 2-amino-ethyl monosulfide
4-phenyl-thiazyl-2-thiomethyl cyclohexyl amine (reaction product of 4-phenyl-thiazyl-2 thiomethylene hydrin and cyclohexyl amine)
4-phenyl-thiazyl-2 benzyl monosulfide
4-phenyl-thiazyl-2 phenyl disulfide
4-phenyl-thiazyl-2 ethyl disulfide
4-phenyl-thiazyl-2 cetyl monosulfide Still other C-aryl thiazyl-2 sulfides are also included in the class of modifiers of this invention. For example, amine sulfides conforming to formula "A" above wherein "X" is a radical linked to the sulfur by an amine nitrogen atom such as 4-phenyl-thiazyl-2 diethyl amino sulfide and the like and the corresponding disulfides are also included in this invention but in general they offer no advantages over the thiazoles from which they are derived.

In the practice of the invention monomeric butadiene-1,3 hydrocarbons either alone or in admixture with other copolymerizable monomers, preferably styrene or acrylonitrile, are polymerized in aqueous emulsion in the presence of any of the above-described aryl-substituted 2-thiothiazyl modifiers. In this process the monomeric materials to be polymerized are emulsified in water with the aid of a suitable emulsifying agent; the modifier of polymerization, together preferably with an initiator of polymerization and, if desired, with catalysts and accelerators of polymerization or other substances necessary or desired for some other purpose, are included in the emulsion and polymerization is then effected at a temperature of about 20 to 100° C. preferably with constant agitation of the emulsion, for a time sufficient to convert a predominant amount, preferably from 75 to 100%, of the monomers into polymers. If the polymerization is conducted only for a time less than is required for substantially complete conversion of monomers into polymers, the polymerization may be terminated at the desired conversion by addition of polymerization inhibitors such as phenyl beta naphthylamine, beta-naphthol and hydroquinone, such substances also serving to stabilize the polymer formed against oxidation. Another alternative in this process consists in adding the modifier of polymerization, or any of the other ingredients, to the emulsion continuously or in stages during the course of the polymerization rather than prior to polymerization. Furthermore, the emulsion polymerization may be carried out in batch operation or it may be effected in a continuous process.

This method of polymerization, employing the aryl-substituted 2-thiothiazyl modifiers described, is applicable to any polymerizable butadiene-1,3 hydrocarbon such as butadiene-1,3, isoprene, 2,3-dimethyl butadiene-1,3, piperylene, 2-ethyl butadiene-1,3, 2-phenyl butadiene-1,3 and the like either alone or in admixture in any suitable proportion with each other or with other unsaturated polymerizable compounds copolymerizable therewith in aqueous emulsion. Compounds copolymerizable with butadiene-1,3 hydrocarbons are generally compounds of the structure

wherein from two to three of the disconnected valences are attached to hydrogen atoms, and are preferably compounds of this

structure wherein additionally at least one of the disconnected valences is attached to an electronegative group such as chlorine, cyano or organic groups comprising a plural linkage such as aryl groups, groups containing a

structure, a —C≡C— structure, a

structure or the like. Such compounds include, in addition to other butadiene-1,3 hydrocarbons, other conjugated dienes containing the structure

wherein at least two of the disconnected valences are attached to hydrogen and at least one is attached to a similar

group such as chloroprene, 2-cyano butadiene-1,3, cyclopentadiene, myrcene, and the like and monoolefinic copolymerizable compounds (compounds containing a single olefinic double bond present in the structure

wherein from two to three of the disconnected valences are attached to hydrogen, and particularly those containing a single olefinic double bond present in a

structure wherein at least one of the disconnected valences is attached to an electronegative group) such as styrene, vinyl naphthalene, para-chloro styrene, para-methoxy styrene, alpha-methyl styrene and other aryl olefins having an aryl group attached to a carbon atom of a

group; acrylonitrile, methacrylonitrile, alpha-chloro acrylonitrile, methyl acrylate, methyl methacrylate, methallyl methacrylate, methyl alpha-chloro acrylate, acrylic acid, acrylamide, methacrylamide and other polymerizable acrylic compounds possessing a

group; vinyl methyl ketone, acrolein, methyl isopropenyl ketone, methyl vinyl ether, methyl vinyl ethynyl carbinol, diethyl fumarate, diallyl maleate, vinyl acetate, vinyl pyridine, vinylidene chloride, isobutylene and other monoolefinic unsaturated hydrocarbons, ethers, acids, alcohols, aldehydes, ketones, and esters of the character described. When mixtures of butadiene-1,3 hydrocarbons with such copolymerizable compounds are employed, it is preferable that the butadiene-1,3 hydrocarbon be present in a predominant amount, that is, to the extent of at least 50% by weight of the mixture.

As mentioned hereinabove, in the polymerization of the butadiene-1,3 hydrocarbon in aqueous emulsion in the presence of the modifiers of this invention, it is generally necessary to employ one or more emulsifying agents. The nature of the emulsifying agents so used may be varied widely, any substances capable of maintaining an aqueous emulsion of the butadiene-1,3 hydrocarbons being effective for this purpose. Suitable emulsifying agents include fatty acid soaps, such as sodium oleate, ammonium linoleate, sodium myristate and the like and soaps of rosin and hydrogenated or dehydrogenated rosin acids such as sodium abietate and sodium dihydroabietate; synthetic saponaceous materials including hymolal sulfates and alkaryl sulfonates such as sodium lauryl sulfate and sodium isopropyl naphthalene sulfonate; salts of organic bases containing long carbon chains such as lauryl amine hydrochloride, trimethylcetylammonium methyl sulfate and C-cetyl betaine; and non-polar emulsifying agents such as the condensation product of lauryl alcohol and ethylene oxide. The choice of the emulsifying agent will depend primarily upon whether it is desired to polymerize in an acid, alkaline or neutral emulsion, all such emulsions of varying pH being effective with the modifiers described, although alkaline emulsions using soaps as emulsifying agents are preferred. The amount of the emulsifying agent may also be varied widely and is not critical but in general amounts of from 1 to 5% based on the material polymerized are preferred, this amount corresponding to considerably less than 5% based on the water present in the emulsion since the amount of polymerizable material is generally less than that of the water present.

In addition to the aryl-substituted 2-thiothiazyl modifiers, the aqueous emulsion of the butadiene-1,3 hydrocarbon will also preferably contain a polymerization initiator since the presence of such substances enables the polymerization to be started rapidly. The preferred initiators to be employed are per-oxygen compounds including hydrogen peroxide, benzoyl peroxide, ammonium persulfate, potassium persulfate, sodium perborate and other peroxides and persalts although other types of initiators such as sulfur dioxide, sodium bisulfite, diazoaminobenzene and triphenylmethylazobenzene may also be used.

It is also especially desirable to employ a polymerization catalyst or accelerator during the polymerization in the presence of the aryl-substituted 2-thiothiazyl modifiers of this invention. Water-soluble heavy metal compounds including both simple water-soluble heavy metal salts and complex water-soluble heavy metal compounds, particularly the water-soluble compounds of heavy metals occurring in group VIII of the first long period of the periodic table (i. e., iron, cobalt and nickel) such as cobaltous chloride, ferric sulfate, sodium ferri pyrophosphate, sodium cobaltinitrite, potassium ferricyanide and the like, are preferred catalysts for use with the modifiers of this invention since their presence greatly speeds up the polymerization rate and also assists in the production of products of the desired high quality. Another class of substances which may be employed to great advantage with the modifiers of this invention are the aliphatic mercaptans containing at least 12 carbon atoms such as lauryl mercaptan, triisobutyl mercaptan, cetyl mercaptan, octadecyl mercaptan and the like. These mercaptans act as accelerators for the polymerizations described and also have some modifying action, but the polymerization in presence of both a mercaptan and an aryl-substituted 2-thiothiazyl modifier results in quite rapid polymerizations yielding high quality products which not only are plastic, easily processed and tacky-like unvulcanized natural rubber but also are capable of yielding vulcanizates which are superior in strength and in other properties to natural rubber vulcanizates, a result which is not possible when employing only a mercaptan as the modifier.

The amounts of the aryl-substituted 2-thiothiazyl modifier, as well as of the polymerization initiators and catalysts, if any, which are employed in the polymerization process may be varied widely depending upon the properties desired in the product as well as upon the particular substances present in the emulsion, and are not strictly critical. In general, however, the amount of the aryl-substituted 2-thiothiazyl modifier will be between about 0.1 and 2.0% by weight based on the weight of polymerizable material present, the higher amounts giving products of greatest plasticity. The amount of the initiator need be only quite small, less than 1.0% generally based on the polymerizable material present while the amount of the catalyst will similarly be less than 1% in most instances, and often less than 0.5%, particularly when the catalyst is a heavy metal compound. However, when mercaptans are employed with the aryl-substituted thiazyl modifiers the amount of each may be between 0.1 and 1.0%, with the amounts of each of the two substantially equal, to good advantage. Generally there is no advantage in employing over 2% of any one of these ingredients or of over 5% of all these ingredients combined; and as little as 0.1% of each ingredient or even less is often quite effective, in the case of water-soluble heavy metal catalysts amounts as little as 0.01% or even less, often being preferable.

It is to be understood that the above discussion of the various ingredients present in the emulsion during polymerization is given only to show preferred procedures and that the polymerization of the butadiene-1,3 hydrocarbon in aqueous emulsion may be conducted in any desired manner, provided only that an aryl-substituted 2-thiothiazyl compound is present in the emulsion during the polymerization.

The products obtained from the above-described emulsion polymerization process consists of latex-like dispersions containing butadiene-1,3 polymers or copolymers dispersed in an aqueous medium. Such synthetic latices may be treated in any desired manner and utilized in the same general manner as natural rubber latex. For example they may be subjected to distillation processes to remove the unpolymerized monomers if any; they may be treated to increase the size of the particles of polymer contained therein; they may be utilized as such either compounded or uncompounded in the production of synthetic rubber articles by deposition processes, coating processes and the like and they may be coagulated in any desired manner to produce a synthetic rubber coagulum closely resembling the unvulcanized natural crude rubber obtained from natural rubber latex in plasticity and processability. Such synthetic rubber may then be utilized in the same general manner as natural rubber to produce a wide variety of vulcanized and unvulcanized products which are often superior to natural rubber products in many properties.

To illustrate the practice of the invention and the desirable results to be obtained by employing the polymerization modifiers herein described, the following specific examples are cited but it is to be understood that wide variations may be effected therein in accordance with the foregoing disclosure without departing from the spirit and scope of the invention.

In the examples, all parts are by weight.

EXAMPLES 1 TO 14

In Examples 1 to 14, details of which are given in Table 1, each charge consisted of 75 parts of butadiene-1,3 and 25 parts of styrene as the polymerizable materials, 180 parts of water containing 5 parts of fatty acid soap as the aqueous emulsifying solution, 0.35 part of potassium persulfate as a polymerization initiator and the stated quantities of polymerization modifiers and other substances as shown in the table. These ingredients were thoroughly mixed to form an emulsion and the monomeric materials present polymerized by agitating the emulsion at a constant temperature of 50° C. for the number of hours given in the table. A small amount of phenyl-beta-naphthylamine was then added to the latex-like dispersion obtained in each case; the dispersion was coagulated and the rubber-like polymer thus obtained was washed and dried. A sample of the synthetic rubber obtained in each case was then tested to determine its solubility in benzene at 40° C. since this test is an excellent criterion of the plasticity and processability of the synthetic rubber, the results being shown in the table. The remaining portion of the polymer obtained in each example was sheeted out on a two-roll mixing mill and was compounded with conventional compounding and vulcanizing ingredients in a typical tire-tread recipe, it being observed in each case that the synthetic rubbers were readily milled either on a hot or cold mill, and possessed a considerable amount of tack both before and after compounding, the product of Examples 9 to 11 being particularly outstanding in this respect. The compounded sample from each example was then vulcanized for 30–45 minutes at 290° F. and the tensile strength and elongation of the resulting vulcanizate was determined and found to be as shown in the table.

Two control charges were also carried out in order to show the effect of the presence of the C-aryl-substituted 2-thiothiazyl modifiers on the polymerization and on the properties of the products. The details of these controls are shown in the table as control A and control B.

It is apparent from the table that the presence of the modifiers of this invention enables butadiene-1,3 styrene copolmers of high solubility and plasticity and of excellent physical proper- Table I

| Ex. No. | Modifier | Other substances (catalysts etc.) | Time, hrs. | Yield, percent | Solubility in benzene, percent | Properties of vulcanizates | |
|---|---|---|---|---|---|---|---|
| | | | | | | Tensile strength, lbs./sq. in. | Ultimate elongation, percent |
| 1 | 4-phenyl-2-mercapto thiazole-0.47 part. | None | 22½ | 89 | 13.8 | 3,400 | 450 |
| 2 | Same as Example 1 | Complex pyrophosphates of iron and cobalt.[1] | 15½ | 82 | 24.0 | 3,800 | 570 |
| 3 | Same as Example 1 | Cobaltous chloride-0.01 part. Ferric sulfate-0.01 part. | 15½ | 85 | 23.6 | 4,050 | 600 |
| 4 | Same as Example 1 | Cetyl mercaptan-0.20 part | 15½ | 85 | 19.5 | 3,450 | 450 |
| 5 | 4-phenyl-2-mercapto thiazole-0.60 part. | None | 22½ | 88 | 23.2 | 3,020 | 525 |
| 6 | Same as Example 5 | Same as Example 2 | 15½ | 91 | 24.1 | 3,250 | 500 |
| 7 | Same as Example 5 | Same as Example 3 | 15½ | 84 | 28.0 | 3,800 | 570 |
| 8 | Same as Example 5 | Lauryl mercaptan-0.20 part | 22½ | 88 | 18.7 | 3,400 | 450 |
| 9 | 4-phenyl-thiazyl-2 disulfide-0.60 part. | None | 22½ | 92 | 31.6 | 3,300 | 520 |
| 10 | Same as Example 9 | Same as Example 2 | 15½ | 77 | 98.7 | 3,750 | 660 |
| 11 | Same as Example 9 | Same as Example 8 | 22½ | 90 | 40.5 | 3,550 | 620 |
| 12 | 4-phenyl-thiazyl-2 thiomethylene hydrin-0.50 part. | None | 22½ | 84 | 8.4 | 2,900 | 625 |
| 13 | Same as Example 12 | Same as Example 2 | 15½ | 89 | 12.6 | 2,900 | 520 |
| 14 | 4-phenyl-thiazyl-2 benzoyl monosulfide-0.60 part. | None | 22½ | 85 | 30.4 | 3,600 | 500 |
| Control A | None | do | 15½ | 75 | 14.8 | 2,600 | 450 |
| Control B | do | None | >41 | | <5.0 | <2,000 | <250 |

[1] An aqueous solution made up from 0.05 part sodium pyrophosphate, 0.035 part ferric sulfate and 0.012 part cobaltous chloride.

ties to be obtained in high yield and in a short time, particularly when polymerization catalysts are present, whereas this is not possible when no modifier of polymerization is present (compare Examples 1 to 14 with control B). Moreover, it is also apparent that the polymers prepared in accordance with the method of this invention are superior to and are obtained in higher yields than those prepared when lauryl mercaptan alone, one of the most effective of the known modifiers of polymerization, is present during the polymerization (compare Examples 1 to 14 with control A).

EXAMPLE 15

A mixture of 75 parts of butadiene-1,3 and 25 parts of acrylonitrile was emulsified with 250 parts of a 3% aqueous solution of myristic acid, 85% of which was present as the sodium soap, which solution also contained 0.35 part of hydrogen peroxide as a polymerization initiator, and 0.05 part of cobaltous chloride as a polymerization catalyst, and was polymerized at 30° C. in the presence of 0.65 part of 4-phenyl-thiazyl-2 disulfide as a polymerization modifier. After 41 hours, a 97% yield of an excellent rubbery butadiene-1,3 acrylonitrile copolymer was obtained. The copolymer was soft, plastic and coherent, it was 35% soluble in benzene, it milled readily and when vulcanized it possessed tensile strengths of 3500-4500 lbs./sq. in. and elongation of 550-650%. In the absence of the modifier a non-plastic, non-coherent copolymer which was only about 1% soluble in benzene was obtained.

EXAMPLE 16

An emulsion containing the following ingredients was prepared:

| | Parts |
|---|---|
| Butadiene-1,3 | 66 |
| Acrylonitrile | 54 |
| Hydrogen peroxide | 0.80 |
| Emulsifying solution (2% aqueous solution of myristic acid 85% neutralized with sodium hydroxide) | 250.0 |
| Ferric sulfate | 0.02 |
| Cobaltous chloride | 0.02 |
| Sodium sulfate | 0.25 |
| 4 - phenyl - 2 - mercaptothiazole | 1.03 |

The emulsion was then polymerized for 18 hours at 30° C. whereupon a 95% yield of a plastic, soluble synthetic rubber closely resembling crude natural rubber was obtained by coagulating the polymerized emulsion. The synthetic rubber was easily milled on either a hot or cold mill and when vulcanized it possessed a tensile strength of 4500-5500 lbs./sq. in. and an ultimate elongation of 650-750%. In the absence of the 4-phenyl-2-mercaptothiazole a 90% yield of copolymer was obtained in 18 hours but the copolymer was tough, non-plastic and non-soluble and difficult to mill and when vulcanized possessed elongations of only 270-320%. When diisopropyl dixanthogen, the most effective of the known modifiers for butadiene-1,3 acrylonitrile copolymerizations, was employed in place of the 4-phenyl-2-mercaptothiazole the polymer obtained was plastic and soluble but the polymerization required 23½ hours to produce an 89% yield, thus showing that the modifiers of this invention possess the advantages of the known modifiers and, in addition, enable higher yields of polymer to be obtained in shorter time.

EXAMPLE 17

Example 16 was repeated employing in place of the 4-phenyl-2-mercaptothiazole, 1.19 parts of 4-phenyl-thiazyl-2 thiomethylene hydrin (4-phenyl-thiazyl-2 hydroxy-methyl sulfide). The polymerization required only 18 hours at 30° C. to produce a 96% yield and the product obtained was a plastic easily-milled synthetic rubber resembling natural crude rubber which when vulcanized yielded strong resistant and resilient vulcanizates.

EXAMPLE 18

An emulsion similar to that described in Example 16 except that 0.3 part of sodium ferri pyrophosphate and 0.005 part of cobaltous chloride were employed in place of the ferric sulfate and cobaltous chloride shown in Example 18 and except that 0.53 part of 4-phenyl-thiazyl-2 5-nitro benzothiazyl-2 monosulfide was employed in place of the 4-phenyl-2-mercapto-thiazole. The polymerization required only 16 hours to produce a 95% yield of an excellent rubbery copolymer which was plastic and easily milled and which yielded strong resistant and resilient vulcanizates.

EXAMPLE 19

An emulsion comprising as the polymerizable materials a mixture of 55 parts of butadiene-1,3, 25 parts of acrylonitrile and 20 parts of methyl methacrylate, sodium isobutyl naphthalene sulfonate as the emulsifying agent, hydrogen peroxide as the polymerization initiator and 4-phenyl-2 mercaptothiazole as the modifier was polymerized at 40° C. There was obtained an excellent synthetic rubber which was more plastic and more soluble in benzene and which was more readily subjected to the processing operations employed with unvulcanized natural rubber, than was the rubber obtained in the absence of the thiazole, thus illustrating the effectiveness of the modifiers of this invention with mixtures comprising more than two polymerizable materials and in emulsions comprising emulsifying agents other than soap.

While the above examples illustrate preferred procedures and partially indicate the extent to which variations and modifications in nature and amounts of polymerizable materials, of modifiers and of other substances, may be made therein, it is to be understood that many other variations and modifications in polymerization methods will occur to those skilled in the art and are within the spirit and scope of the invention as defined by the appended claims.

I claim:

1. The method which comprises polymerizing in aqueous emulsion a butadiene-1,3 hydrocarbon in the presence of a compound containing a monovalent aryl group attached to a carbon atom of a 2-thiothiazyl group.

2. The method which comprises polymerizing in aqueous emulsion a mixture of a butadiene-1,3 hydrocarbon and a compound copolymerizable therewith in aqueous emulsion, in the presence of a compound containing a monovalent aryl group attached to a carbon atom of a 2-thiothiazyl group.

3. The method which comprises polymerizing in aqueous emulsion a mixture of a butadiene-1,3 hydrocarbon and a compound copolymerizable therewith in aqueous emulsion, in the presence of a C-monovalent-aryl-2-mercapto thiazole.

4. The method which comprises polymerizing in aqueous emulsion a butadiene-1,3 hydrocarbon in the presence of 4-phenyl-2-mercapto thiazole.

5. The method which comprises polymerizing in aqueous emulsion a mixture of butadiene-1,3 and a copolymerizable monoolefinic compound, in the presence of a C-aryl-2-mercapto thiazole and in the additional presence of a water-soluble heavy metal compound.

6. The method which comprises polymerizing in aqueous emulsion a mixture of butadiene-1,3 and styrene in the presence of a C-aryl-2-mercapto thiazole.

7. The method which comprises polymerizing in aqueous emulsion a mixture of butadiene-1,3 and styrene in the presence of 4-phenyl-2-mercapto thiazole and in the additional presence of a water-soluble group VIII heavy metal compound.

8. The method which comprises polymerizing in aqueous emulsion a mixture of a butadiene-1,3 hydrocarbon and a compound copolymerizable therewith in aqueous emulsion, in the presence of a C-aryl-thiazyl-2 sulfide.

9. The method which comprises polymerizing in aqueous emulsion a mixture of a butadiene-1,3 hydrocarbon and a compound copolymerizable therewith in aqueous emulsion, in the presence of a C-aryl-thiazyl-2 sulfide of the formula

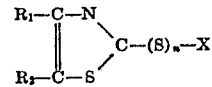

wherein $R_1$ and $R_2$ are monovalent groups containing no element other than carbon and hydrogen, at least one of which is an aryl group, $n$ is an integer less than four, and X is a monovalent organic radical containing no elements other than carbon, hydrogen, oxygen, nitrogen and sulfur and having its unattached monovalent bond on a carbon atom.

10. The method which comprises polymerizing in aqueous emulsion a mixture of butadiene-1,3 and a copolymerizable monoolefinic compound, in the presence of a C-aryl-thiazyl-2 sulfide of the formula

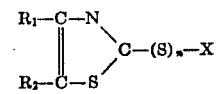

wherein $R_1$ and $R_2$ are monovalent groups containing no elements other than carbon and hydrogen, at least one of which is an aryl group, $n$ is an integer less than four and X is an electronegative monovalent organic radical containing no elements other than carbon, hydrogen, oxygen, nitrogen and sulfur and having its unattached monovalent bond on a carbon atom.

11. The method of claim 10 further characterized in that the polymerization is carried out in the additional presence of an aliphatic mercaptan containing at least 12 carbon atoms.

12. The method of claim 10 further characterized in that the polymerization is carried out in the additional presence of a water-soluble group VIII heavy metal compound.

13. The method which comprises polymerizing in aqueous emulsion a mixture of butadiene-1,3 and a copolymerizable monoolefinic compound, in the presence of a C-aryl-thiazyl-2 sulfide of the formula

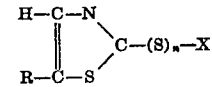

wherein R is aryl, $n$ is an integer less than four and X is a thiazyl-2 radical.

14. The method which comprises polymerizing in aqueous emulsion a butadiene-1,3 hydrocarbon in the presence of 4-phenyl-thiazyl-2 disulfide.

15. The method which comprises polymerizing in aqueous emulsion a mixture of butadiene-1,3 and styrene in the presence of 4-phenyl-thiazyl-2 disulfide.

16. The method which comprises polymerizing in aqueous emulsion a mixture of butadiene-1,3 and styrene in the presence of 4-phenyl-thiazyl-2 disulfide and an aliphatic mercaptan containing at least 12 carbon atoms.

17. The method which comprises polymerizing in aqueous emulsion a mixture of butadiene-1,3 and acrylonitrile in the presence of 4-phenyl-thiazyl-2 disulfide.

18. The method which comprises polymerizing in aqueous emulsion a mixture of butadiene-1,3 and acrylonitrile in the presence of 4-phenyl-thiazyl-2 disulfide and a water-soluble group VIII heavy metal compound.

CHARLES F. FRYLING.